United States Patent [19]

Goldstein et al.

[11] 4,108,277

[45] Aug. 22, 1978

[54] WORK PLATFORM

[76] Inventors: Leonard Goldstein; Michael Yashin, both of 660-668 Berriman St., Brooklyn, N.Y. 11208

[21] Appl. No.: 787,650

[22] Filed: Apr. 14, 1977

[51] Int. Cl.[2] .......................... E04G 3/14; E04G 1/16
[52] U.S. Cl. ...................................... 182/82; 182/150
[58] Field of Search ............... 182/150, 206, 113, 116, 182/129, 82, 93, 222

[56] References Cited

U.S. PATENT DOCUMENTS

| | | | |
|---|---|---|---|
| 482,402 | 9/1892 | Booth | 182/206 |
| 2,701,168 | 2/1955 | Schemer | 182/116 |
| 3,465,846 | 9/1969 | Jacobson | 182/150 |
| 4,022,293 | 5/1977 | Hallagin | 182/150 |

FOREIGN PATENT DOCUMENTS 1,288,242   2/1962   France ..................................... 182/150

*Primary Examiner*—Reinaldo P. Machado
*Attorney, Agent, or Firm*—Ladas, Parry, Von Gehr, Goldsmith & Deschamps

[57] ABSTRACT

A work platform for use in the servicing of jet engines including a frame, curved to conform with the exterior of the engine, carrying at its lower end a personnel supporting platform, a plurality of latch members rigidly attached to the upper end of the frame and adapted to engage cowling mountings on the engine thereby to support the work platform upon the engine, said latch members being adapted for insertion within the cowling mountings when said work platform is pivoted away from said engine about the end of the frame adjacent the latch members and for work platform supporting locking engagement with the cowling mountings upon pivotal movement of the work platform into an operational position on the engine following insertion of the latch members into the cowling mountings.

6 Claims, 9 Drawing Figures

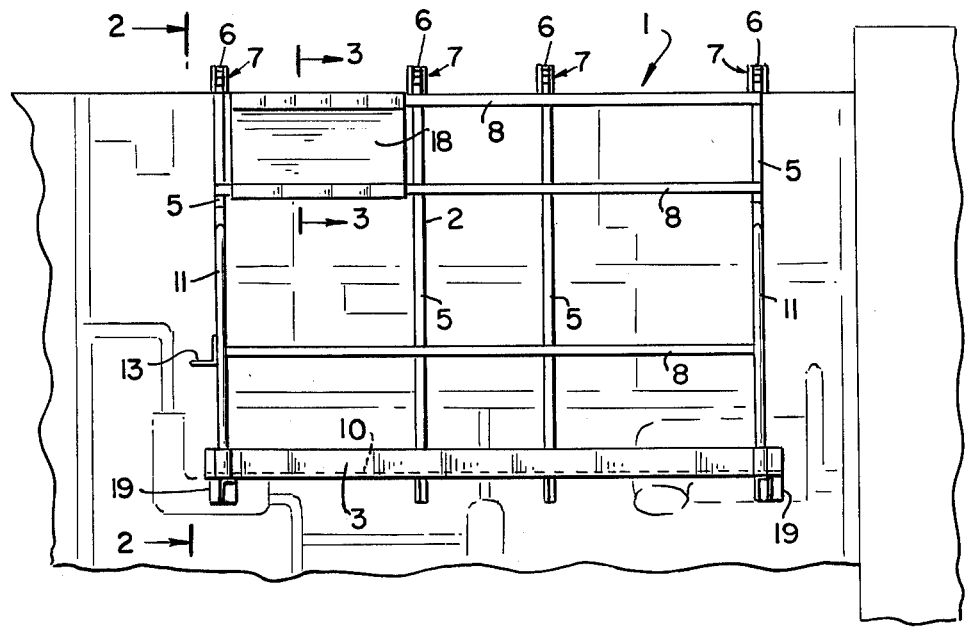
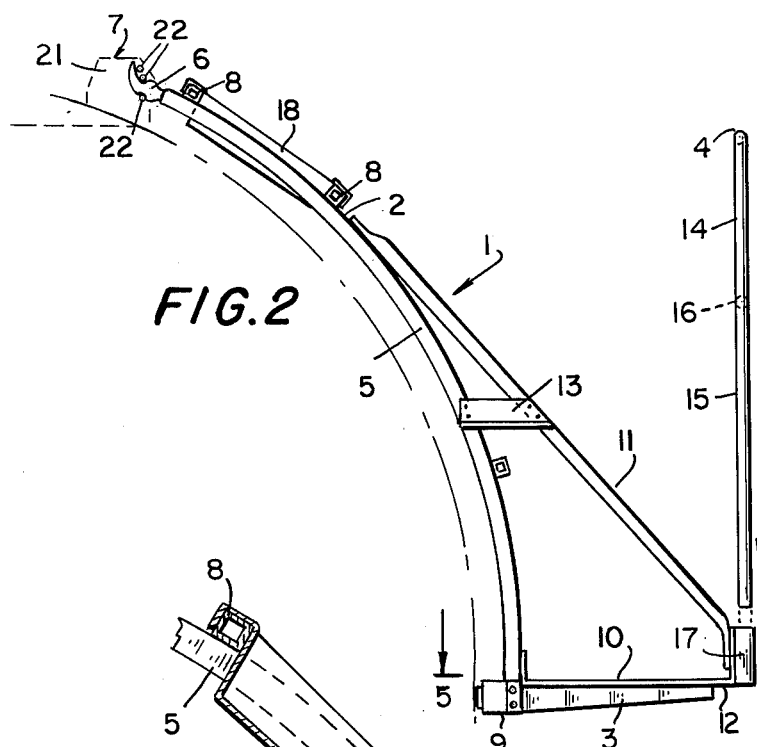
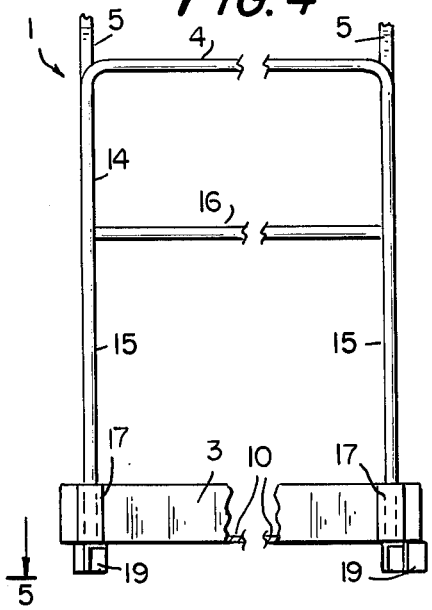
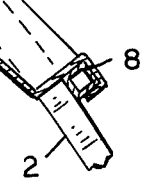
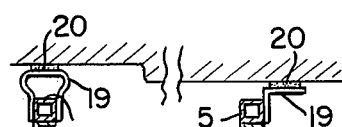
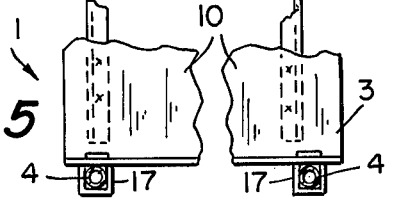

WORK PLATFORM

The present invention relates to work platforms suitable for mounting on jet engines.

In the past the maintainence of modern jet engines, which frequently are of a substantial size not permitting ready access to many components, has entailed the use of motorized platforms to support personnel when carrying out maintainence activities which a man standing on the ground cannot carry out, particularly those on the upper portion of the engine.

The present invention eliminates the need for the use of such expensive motorized equipment for maintainence equipment in the maintainence of jet engines and thus facilitates the more economical and effective maintainence of engines of jet aircraft.

According to the present invention there is provided

A work platform for attachment to a jet engine having a plurality of mountings located on the upper portion of the engine, each comprising upper and lower spaced apart horizontal support pins rigidly located with respect to the engine; the work platform comprising a frame curved to generally conform with the exterior of a said engine, latch members rigidly attached to and extending from said frame and adapted to attach the frame to said mountings, a platform attached to the frame remote from the latch members and extending horizontally from the frame when the latch members are attached to the mountings, and stop means located adjacent the platform to rest against the engine when said latch members are attached to the mountings, wherein each latch member is positioned to engage a corresponding mounting and has a tapered tongue to facilitate insertion of the latch member into the space between the upper and lower horizontal pins of an associated mounting and a recess adjacent the base of the tongue to engage the lower of the horizontal pins when the latch member is inserted into the space, the tongue having a surface to engage the upper of the horizontal pins upon pivotal motion of the platform into an operational position in which said stops are resting against the engine when the lower horizontal pin is engaged with the recess, the recess being oriented to prevent removal of the latch member from the mounting, by virtue of the cooperation of the latch member with the upper and lower horizontal pins, when the platform is in said operational position.

A work platform suitable for use on an engine of a "Boeing 747" aircraft will now be described, by way of example, with reference to the accompanying drawings, in which;

FIG. 1 is a side elevation of the work platform with guardrail removed and shown mounted on a jet engine;

FIG. 2 is an end elevation as seen in the direction of arrows 2—2 in FIG. 1, together with its guardrail;

FIG. 3 is a fragmentary cross-section along section line 3—3 of FIG. 1;

FIG. 4 is a fragmentary side elevation showing the guardrail attached to the remainder of the work platform;

FIG. 5 is a fragmentary section along section line 5—5 of FIG. 2;

Figure 8:
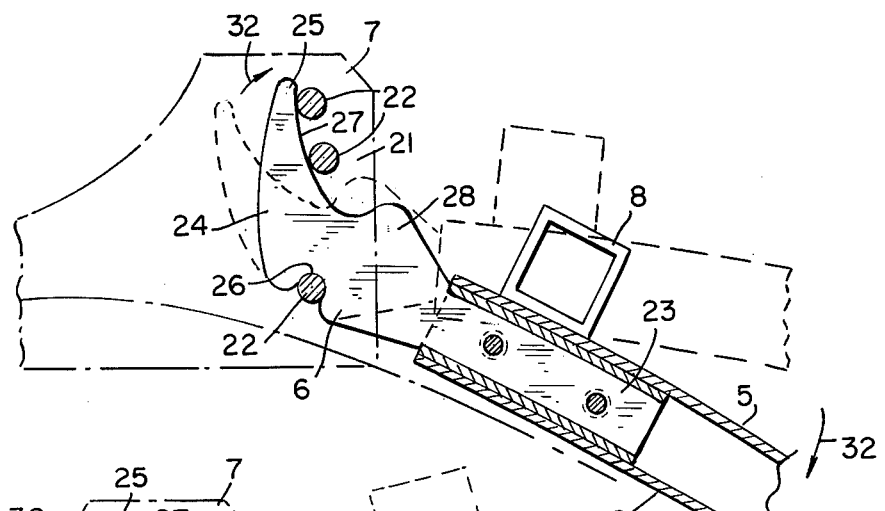
Figure 7:
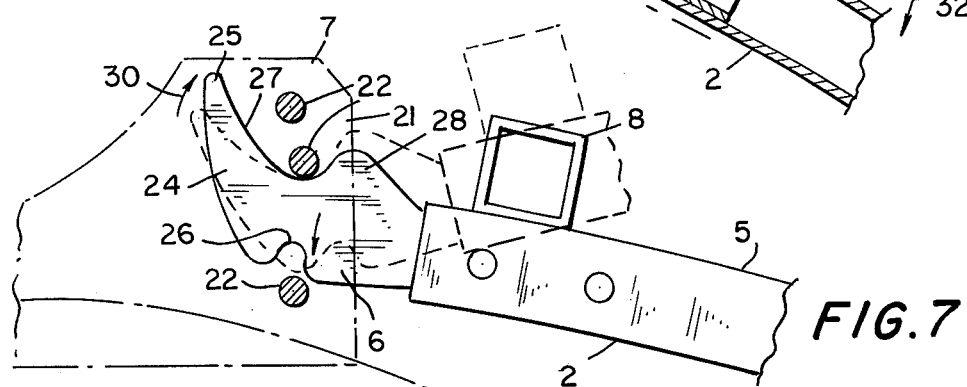
Figure 6:
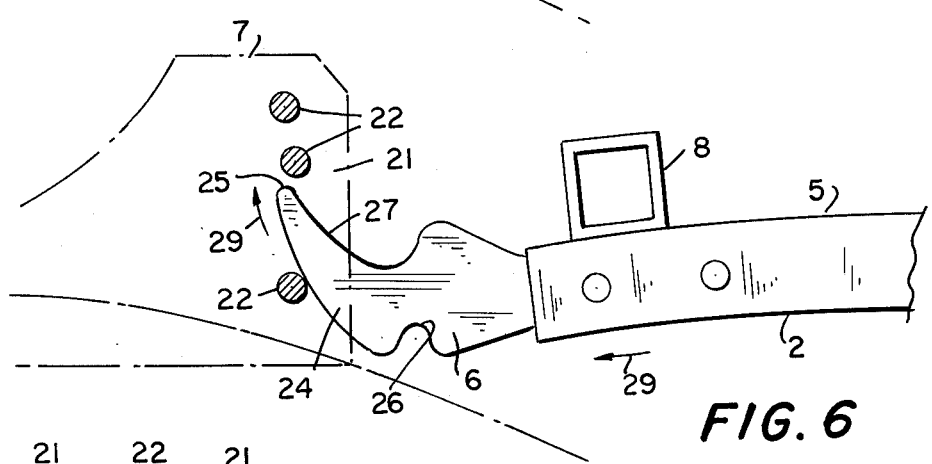
Figure 9:
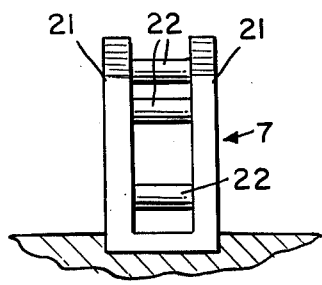

FIGS. 6, 7, and 8 illustrate the operation of a latch arrangement for mounting the work platform onto the engine; and FIG. 9 is an elevation of a cowling mount of the engine to which the latch arrangement of the work platform is attached.

The work platform comprises a curved frame 2, a platform 3, and a guardrail 4, and latch members 6.

The curvature of the curved frame 2 conforms with the curved profile of the engine for which the work platform 1 is designed and includes four generally vertical tubular members 5 of square cross-section having attached to their upper ends latch members 6 arranged to engage cowling mountings 7 which form part of the engine structure. The tubular members are spaced apart a distance which will result in the attached latch members 6 being spaced by the distance between the cowling mountings 7.

The tubular members 5 are maintained in their spaced relationship by horizontal tubular members 8 of square cross-section to which they are rigidly attached by welding and by one side 9 of platform 3, which is rigidly attached to the ends of tubular members 5 remote from latch members 6.

The platform 3 extends away from the convex side of the curved tubular members 5 at an angle in relation to the curve members which will result in support surface 10 of the platform being horizontal when the work platform 1 is mounted on an engine as shown in FIGS. 1 and 2. The support surface 10 has a diamond shaped non-slip pattern thereon and is constructed of aluminum. The remainder of the work platform 1 is of welded steel construction. It will, of course, be appreciated that the entire platform may be made of aluminum or of steel or of any other material fulfilling the strength and rigidity requirements of such a platform. Tie bars 11 are disposed at each end of platform 3 to attach side 12 to the outer tubular members 5 of the four tubular members 5 at a point approximately ⅓ of the length of the tubular members 5 from the latch members 6. The tie bars are rigidly attached to their respective contact points on the platform and tubular members 5 thereby to support side 12 of platform 3.

A step 13 is rigidly attached between one of the tie bars 11 and its associated tubular member 5.

Guardrail 4 comprises a U-shaped tubular member 14. Between the legs 15 of the U is rigidly attached a tubular member 16 in order to provide rigidity for the guardrail. The free ends of the U-shaped tubular member are arranged to slidably engage vertically disposed tubular mounting brackets 17 which are rigidly attached one at each end of side 12 of platform 3. A tool tray 18 is mounted between an adjacent pair of tubular members 5 between the two horizontal tubular members 8 closest to the latch members 6.

When attached to an engine the four latch members 6 are engaged with the four cowling members 7 while the platform end of the tubular members 5 is held in spaced relationship from the engine and its accessories by stop members 19 which are rigidly attached to the outer two of the tubular members 5. The size and shape of the stop members 19 is determined by the particular arrangement of the engine on which the platform is to be used. Each stop member 19 has a resilient pad 20 to avoid damage to the engine.

The cowling mountings 7 each comprise vertical side support plates 21 which support three horizontally extending support pins 22 disposed generally one above the other with the lower two of these support pins 22 spaced apart by a distance sufficient to permit insertion of a latch member 6 therebetween during engagement and disengagement of the work platform 1 respectively to and from the cowling mountings 7.

FIGS. 6, 7 and 8 illustrate the manner in which the latch members are engaged with the cowling mountings in order to provide support for the work platform. It will be appreciated that disengagement of the work platform from the engine will involve a reversal of the procedure discussed with respect to FIGS. 6, 7 and 8.

Each latch member 6 consists of a tail 23 which is rigidly attached within the end of the associated tubular member 5 and a tongue which extends outwardly from the end of the associated tubular member 5. The tongue 24 curves upwardly away from tubular member 5 while simultaneously tapering from a width which will just freely pass between the lower pair of support pins 22 to a narrow curved tip 25. At the base of the tapered tongue 24 on the lower side of the tongue is a recess 26 adapted to house the lower of the three pins 22. The upper surface 27 of the tapered tongue 24 is positioned and oriented in relation to the work platform so that when the lower of the pins 22 is engaged in the recess 26 and the work platform is in position with the stop members 19 engaging the structure of the engine, the surface 27 will engage the upper two of pins 22.

Between the adjacent end of the associated tubular member 5 and tongue 24 is a broad base portion 28 the width of which adjacent the recess 26 is sufficient to prevent passage of the base portion 28 between the lower pair of pins 22.

To mount the work platform 1 on the jet engine, the platform is raised so that the tubular members 5 are disposed at an angle in relation to the horizontal as shown in FIG. 6 and the tip 25 of tongue 24 is inserted between the lower pair of pins 22 in the manner shown by arrows 29 in FIG. 6. When the base portion 28 engages the lower pair of pins 22 the lower of pins 22 is brought into engagement with the recess 26 and the work platform 1 is pivoted about the pins 22 as shown by arrow 30 in FIG. 7. Arrow 31 in FIG. 7 shows the direction of movement of latch member 6 to bring the lower of the pins 22 into engagement with the recess 26.

When the lower of pins 22 is fully engaged within the recess 26 the work platform is pivoted downwardly to bring the work platform into its operational condition with the latch members 6 captively engaged within the cowling mountins 7 and the stop members 19 resting on the structure of the engine. This movement of the work platform is indicated by arrows 32 in FIG. 8.

What I claim is:

1. A work platform for attachment to a jet engine having a plurality of mountings located on the upper portion of the engine, each comprising upper and lower spaced apart horizontal support pins rigidly located with respect to the engine; the work platform comprising a frame curved to generally conform with the exterior of a said engine, latch members rigidly attached to and extending from said frame and adapted to attach the frame to said mountings, a platform attached to the frame remove from the latch members and extending horizontally from the frame when the latch members are attached to the mountings, and stop means located adjacent the platform to rest against the engine when said latch members are attached to the mountings, wherein each latch member is positioned to engage a corresponding mounting and has a tapered tongue to facilitate insertion of the latch member into the space between the upper and lower horizontal pins of an associated mounting and a recess adjacent the base of the tongue to engage the lower of the horizontal pins when the latch member is inserted into the space, the tongue having a surface to engage the upper of the horizontal pins upon pivotal motion of the platform into an operational position in which said stops are resting against the engine when the lower horizontal pin is engaged with the recess, the recess being oriented to prevent removal of the latch member from the mounting, by virtue of the cooperation of the latch member with the upper and lower horizontal pins, when the platform is in said operational position.

2. A work platform according to claim 1 in which there are two upper horizontal pins and the upper pin engaging surface of the tongue is shaped to engage both upper horizontal pins when the work platform is in said operational position.

3. A work platform according to claim 2 in which the frame has four substantially vertical curved tubular support members and four latch members are attached one to the top of each said support member to engage four similarly spaced mountings on said engine.

4. A work platform according to claim 3 wherein the members join the portion of the platform remote from the frame to the frame thereby to additionally support the platform.

5. A work platform according to claim 4 wherein a guardrail is removably mounted in mounting tubes vertically disposed on the remote part of the platform.

6. A work platform according to claim 5 wherein a tool tray is mounted to the frame adjacent the latch members.

* * * * *